July 22, 1941.    J. M. LARSON    2,250,111
SURFACE TYPE DAMPER REGULATOR
Filed Sept. 3, 1937    2 Sheets-Sheet 1

INVENTOR
John M. Larson
BY
George H Fisher
ATTORNEY

July 22, 1941.  J. M. LARSON  2,250,111
SURFACE TYPE DAMPER REGULATOR
Filed Sept. 3, 1937  2 Sheets-Sheet 2
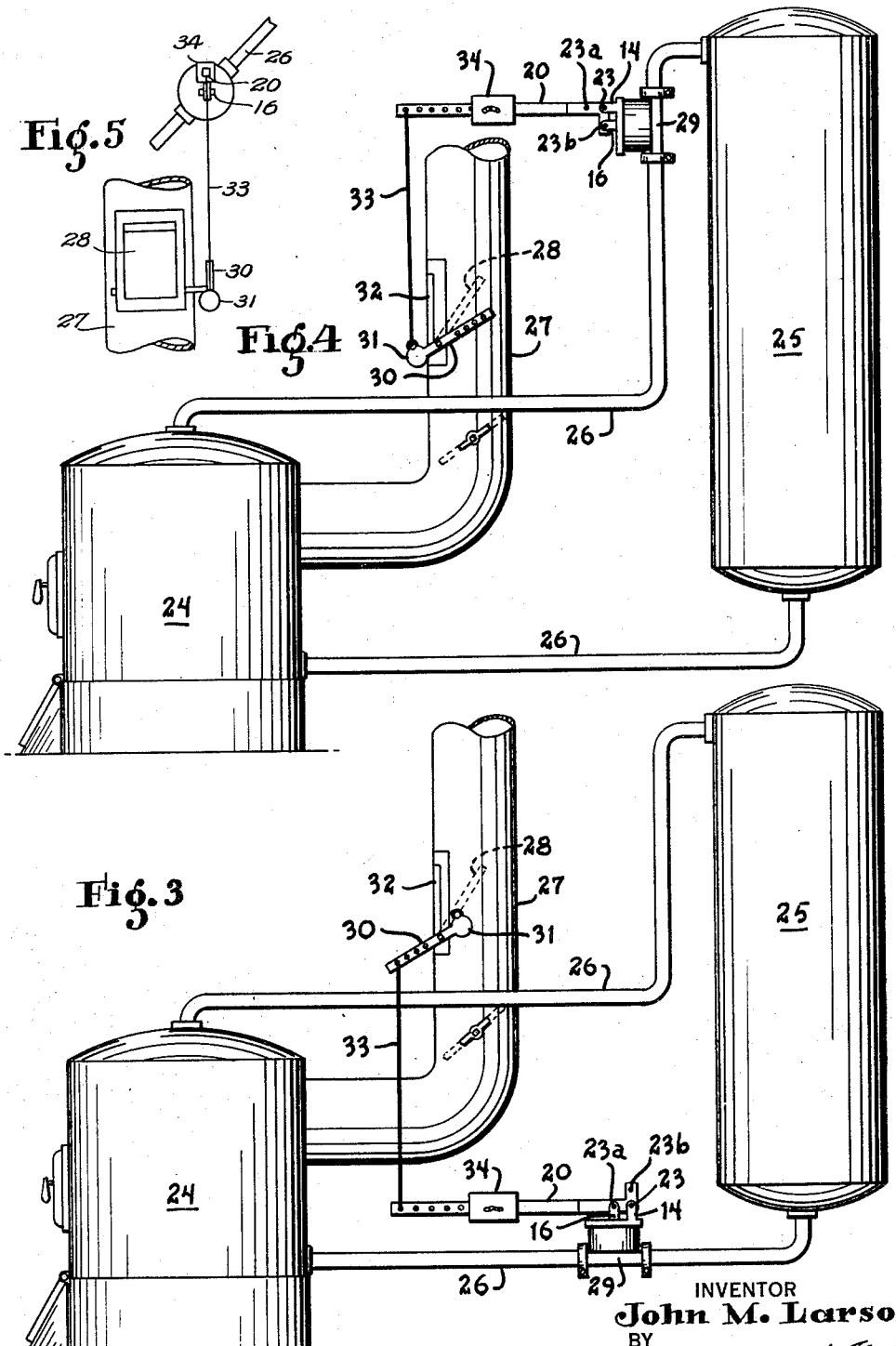
INVENTOR
John M. Larson
BY
George H. Fisher
ATTORNEY Patented July 22, 1941

2,250,111

UNITED STATES PATENT OFFICE 2,250,111

SURFACE TYPE DAMPER REGULATOR

John M. Larson, Chicago, Ill., assignor to Minneapolis-Honeywell Regulator Company, Minneapolis, Minn., a corporation of Delaware Application September 3, 1937, Serial No. 162,327

5 Claims. (Cl. 297—4)

This invention relates to regulators for dampers or the like and is more particularly concerned with automatic temperature regulators for adjusting the position of draft dampers in furnace pipes or stacks or in other conduits conveying gaseous media, such as ventilating ducts and air conduits in air-conditioning systems.

Automatic regulators responsive to the temperature of a fluid circuit have been in the past employed to regulate dampers, but the general practice has been to dispose the thermal responsive element in a well at some point in the fluid circuit. As can be readily understood by those skilled in the art, such practice necessitated that the fluid circuit, such as the water pipes in a water heating system for example, had to be broken at some point for insertion of proper connections, such as T-connections for retaining the well previously referred to. As a result, the location of the temperature regulator was usually restricted to some point in the system where connections capable of being broken already existed and where the regulator could be conveniently installed. Such installation required the services of a plumber or other skilled artisan involving considerable expense, and rendered it equally difficult and expensive to make alterations in the way of changing the position of the regulator. More commonly, such point was not the most desirable from the standpoint of efficiency of operation and accessibility for calibration, repairs, and the like.

The present invention is intended to eliminate the disadvantages mentioned in connection with previously known devices of a similar nature and at the same time to improve the general efficiency and usefulness of the device.

Among the principal objects of the invention are:

The provision of a surface type damper regulator which may be clamped or otherwise secured at a convenient point in intimate thermal relation with a conduit or a body having variable temperatures.

The provision of a temperature regulator having broad application and great flexibility and ease of installation on different types of equipment and in different positions on the same apparatus.

The provision of a temperature regulator having increased usefulness and efficiency by reason of a new and novel structural relationship between the temperature responsive element and the body having variable temperatures.

Other purposes accomplished and advantages gained by the invention will become apparent to those skilled in the art after reading the following detailed description.

Among the various figures included in the drawings,

Fig. 3 is a view of a conventional type of domestic hot water heating system having the automatic regulator secured to a horizontal portion of the water pipe and arranged to adjust a damper in the furnace pipe.

Fig. 4 is a view of a system like that of Fig. 3 with the automatic regulator secured to a vertical portion of the water pipe.

Fig. 5 is a view of a domestic hot water heating system with the automatic regulator secured to an inclined portion of the water pipe.

Figure 2:
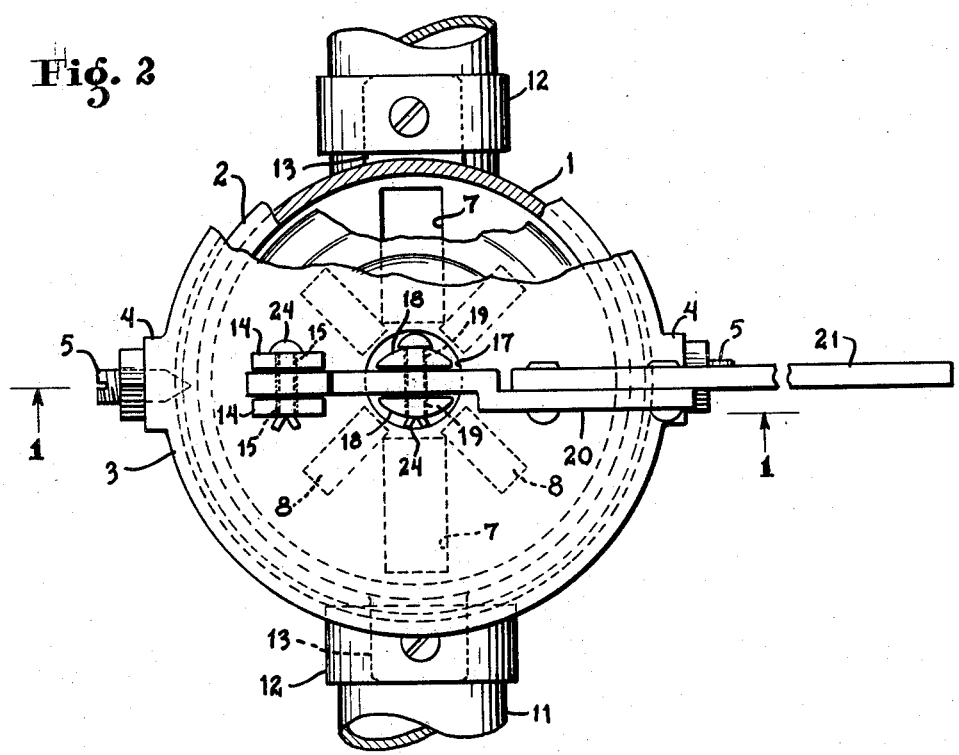
Fig. 2 is a plan view of the improved automatic temperature regulator having a portion at the top broken away to show the interior.
Figure 1:
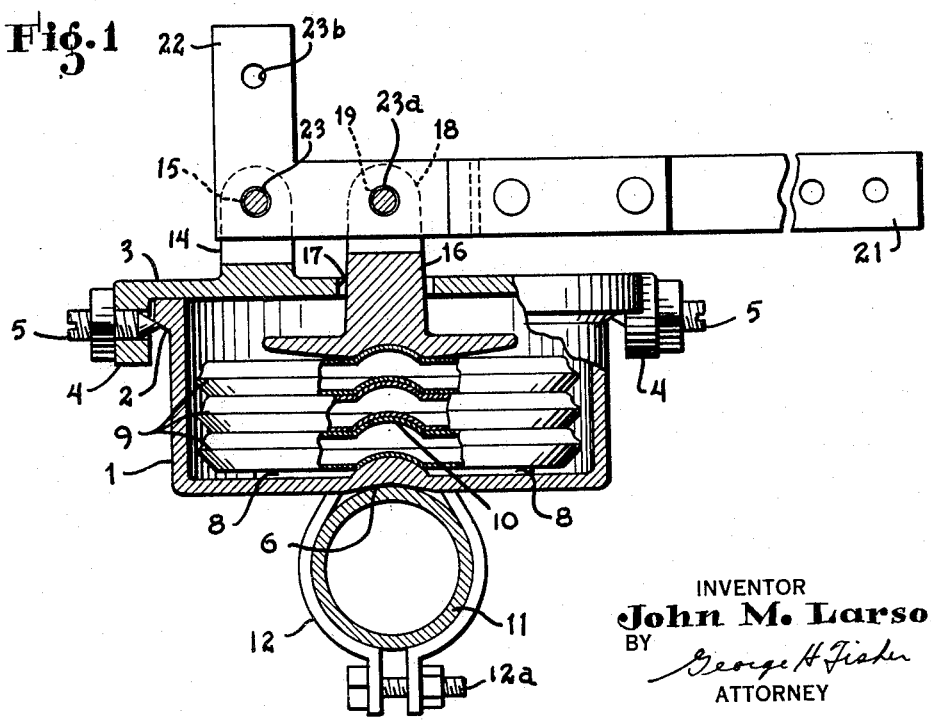
Fig. 1 is an elevation partly in cross section of Figure 2 taken along the line I—I of Figure 2.

Referring to the drawings, and more particularly to Fig. 1, numeral I represents a generally cylindrical casing having a flange 2 at the rim of its upper edge. Numeral 3 represents a circular cover for the casing I, this cover having two lugs or ears 4 on opposite sides of its periphery and diametrically opposed to each other. These ears or lugs extend downwardly as shown, and are tapped to receive screws 5 which engage with the flanged rim 2 of the casing I for securing the cover in place. The bottom of the casing I is slightly dished as shown at 6, the configuration of this dished portion conforming to the contour of a conduit or pipe II to which the casing I is secured. Strap clamping means 12 are secured to lugs or ears 13 formed at the sides of casing I and are provided with bolts 12a for securely clamping the casing I to conduit II, the conduit II snugly engaging the dished portion of the bottom of casing I.

Within the casing I is a temperature responsive element composed of three metal-walled cells 9. These cells are of generally flat cylindrical shape and are made of a flexible material to provide for expansion due to temperature changes. Each of these cells is filled with a volatile fluid for the purpose of causing them to expand and contract upon change in temperature, as is well known in the art. As shown in Fig. 1, there is a bulged portion of rounded configuration on the inside of the bottom wall of casing I at the center. Each of the cells 9 also has a corresponding bulged portion in its top and bottom walls, the top one being convex while the lower one is concave. As shown, these bulged portions of the cells engage with those of the next adjacent cells and the bottom of the lower cell engages with the bulge in the bottom of the casing 1. This construction retains the cells in alignment with each other and maintains the cells spaced from the walls of casing 1.

On the inner side of the bottom of casing 1 are rectangular radially arranged bosses 8 which space the cells 9 from the bottom of the casing 1 to provide for circulation of air. Also at the bottom of casing 1 are rectangular openings 7 which are within the boundaries of the previously described dished portion which engages with the conduit 11.

Projecting upwardly from the cover 3 of casing 1 are lugs 14 which are perforated as shown at 15, to form in effect a clevis. Numeral 16 represents a member formed to engage the bulge in the top side of the upper cell 9 within casing 1, and which extends through an opening 17 in the cover 3. The upper portion of member 16 is formed with two lugs 18 similar to lugs 14, which are perforated at 19 and which form in effect a clevis. Numeral 20 represents a lever arm having perforations 23a and 23b spaced from a perforation 23 at a distance equal to the distance between the perforations in lugs 14 and 18. This lever arm 20 is shown as being L-shaped and having a long arm 21 and a short arm 22, the arms 21 and 22 having perforations 23a and 23b, respectively, which are equally spaced from the perforation 23 common to the two arms. While this lever arm is disclosed as being L-shaped, it is understood that it may take various shapes all within the scope of the invention. Lever arm 20 is pivoted between lugs 14 which form a fulcrum as shown, and it is also pivoted between lugs 18 of member 16. Cotter pins 24 extend through the lugs and through the perforations in the lever arm and serve as pivots.

While Fig. 1 shows lever arm 20 having the longer arm pivoted to member 16, it is readily seen that lever arm 20 can be mounted so that the short arm 22 is pivoted to member 16 at perforation 23b. This interchangeability is an important feature of the invention and provides for transmitting the movements of cells 9 in various directions and at different angles from the temperature regulator itself. The flexibility provided by the interchangeability construction of lever arm 20 will be pointed out more in detail later in connection with the description of Figures 3 and 4.

The casing 1 of the device is secured to a conduit such as conduit 11 conveying a fluid having variable temperatures. As has been previously pointed out, the cells 9 are filled with a volatile fluid and form a resilient element which expands and contracts in accordance with changes in temperature of the fluid within conduit 11. By reason of the openings 7 in the bottom of casing 1, portions of conduit 11 are directly exposed to the interior of casing 1, thereby permitting radiation of heat directly to the cells 9 inside of casing 1. The importance of this feature of the invention resides in the fact that the temperature responsive element made up of cells 9 is to respond to the surface temperatures of conduit 11. This result is accomplished by providing for direct radiation from conduit 11 to the cells 9 in the interior of casing 1.

The bosses 8 serve to space the cells 9 from the bottom of the casing 1 whereby radiation of heat will take place from the exposed surfaces of conduit 11 to the surfaces of the diaphragm forming the bottom of the lower cell 9. This spacing also provides for circulation of air around the cells and under the cells into contact with the heated bottom wall of the casing and with the exposed surface of pipe 11, thereby causing the cells to be heated by convection as well as by radiation. Also, the cells are heated by conduction through the bosses 8. From the foregoing, it will be seen that by my novel construction heat transfer by radiation, convection, and conduction is caused to take place between pipe 11 and the thermostatic element, this causing the temperature of the thermostatic element to promptly follow any change in temperature of pipe 11.

Movements due to expansion or contraction of the cells 9 are transmitted through member 16 to the lever arm 20 causing it to rotate through an angle about the pin 24 as a fulcrum.

By loosening the screws 5, the engagement of cover 3 with flange 2 of casing 1 can be made less tight thereby permitting rotation of cover 3 and the lever arm assembly about the casing 1. This construction provides for arranging the lever arm 20 in any desired angular position in order to facilitate making mechanical connections between lever arm 20 and any device to be controlled regardless of its position with respect to the temperature regulator. This feature of construction will be more particularly described later in connection with the interchangeability of lever arm 20 and in connection with the description of Figures 3 and 4.

Figure 3 shows a conventional type domestic hot water heating system employing the improved temperature regulator, the utility and novelty of which can be more clearly made apparent as applied to this system. Numeral 24 represents a furnace of conventional type, and 25 a tank for water heated thereby. The furnace 24 and the tank 25 are connected by pipes 26 for circulating water between the furnace and the tank. The furnace pipe or stack 27 has a check draft in the form of a damper 28 which is automatically adjusted by the temperature regulator. The damper 28 is actuated through the medium of a lever arm 30, which lever arm is disposed at an angle to the damper as shown. The damper 28 is movable to provide more or less opening for air through the cut-away portion 32 in pipe 27 and to restrict or augment the amount of draft. The lever arm 30 which actuates the damper has a weight 31 at one end, as shown, which biases the damper towards draft checking position. In Figure 3 the temperature regulator is shown strapped to a horizontal portion of pipe 26, which portion is below the damper. In this figure, the lever arm 20 has the longer arm pivoted to member 16 of the temperature regulator as shown, the fulcrum being at lugs 14. The longer arm of lever 20 extends horizontally to a position below the damper operating lever arm 30, and is connected thereto by a flexible connection such as a cord or chain 33. It will be noted that by reason of the rotatability of the cover 3 the perforated end of lever arm 20 can be swiveled around to a position lying in the plane of motion of the arm 30. Hence, if pipe 26 does not happen to be located directly below the damper, the rotatability of the cover 3 provides for compensation to bring the end of the lever arm into the plane of motion of lever 30.

In operation, the thermal responsive element formed by the cells 9 within the casing 1 expand or contract in response to variable temperatures within the pipe 26. These movements are transmitted through member 16 to the lever arm 20, causing it to rotate through an angle about the point fulcrumed at lugs 14. These movements are further transmitted through the flexible cord or chain 33 and move lever arm 30 correspondingly. As damper 28 moves with the lever arm 30, it is obvious that movements of damper 28 correspond to temperature changes of the fluid in conduit 26. As can be readily seen, a rise of temperature will cause expansion of the cells 9, causing the outer end of lever 20 to rise and thereby permitting weight 31 to move lever arm 30 and damper 28 in a clockwise direction as seen on Figure 3. This results in more air being permitted to enter through opening 22 in pipe 27 and the amount of draft in pipe 27 from the furnace being restricted. This reduction in draft tends to lessen the rate of combustion in the furnace 24, resulting in less heat being imparted to the water being circulated therethrough. Consequently, the effect of the temperature regulator is to maintain the system in a state of thermal equilibrium at the desired temperature for which the temperature regulator is set.

Slidably arranged upon the lever arm 20 is a weight 34 which can be adjusted to various positions indicated by the perforations adjacent the end of the arm 20. This weight tends to balance the weight 31 and the force exerted on lever arm 20 by the thermal responsive element in the casing 1. It is readily seen that by moving the weight 34 outwardly on the arm 20, it will necessitate that the thermal element within the casing 1 exert a greater pressure in order to move the lever arm in a direction for causing checking of the draft. Thus by moving the weight 34 outwardly on the arm 20, the water in the system must be heated to a higher temperature before the device will act to cut down the amount of draft in the pipe 27. The adjustability of weight 34 therefore provides a convenient and simple means by which anyone may adjust the apparatus to maintain any desired temperature in the system.

In Figure 3 it will be noted that I have illustrated the damper regulator as applied to the cold water circulator pipe 26 and upon a horizontal portion of this pipe. This is but one of many manners in which the regulator may be installed. For another mode of installation, reference is made to Figure 4, which shows how the regulator may be applied to the outlet or hot water circulator pipe on a portion of this pipe which happens to be vertical and located at a point above the damper. In this position of the temperature regulator, the lever arm 20 is mounted with the shorter arm pivoted to the member 16 with the perforation 23 common to the two arms remaining at the pivot point in the lugs 14 on the temperature regulator. The advantage and utility of the interchangeability feature of the lever arm 20 now becomes apparent, as by mounting the lever arm 20 in the position shown in Figure 4 its outer end can be brought into a position above the damper 28 and lever arm 30, and also by this arrangement the end of the lever arm is caused to oscillate in a vertical direction.

The lever arm 30 in Figure 4 has a position reverse to its position in Figure 3 with respect to the damper 28. Thus weight 34 biases the damper in a counter-clockwise direction so as to increase the draft upon a decreasing temperature in pipe 26.

In the event that the vertical portion of the pipe 26 is disposed at an angle to the vertical rather than in an exactly vertical position, the rotatable cover 3 of casing 1 may be swiveled around so that lever arm 20 moves in a vertical plane corresponding to that of arm 30. Of course, in order to have lever arm 20 movable in the same vertical plane as arm 30 it is necessary for the regulator to be placed on the pipe at a point substantially lying in the plane of movement of arm 30. For example, if the temperature regulator is mounted generally in the position shown in Figure 4 but on a section of pipe adjacent the plane of movement of arm 30 and inclined with respect to the vertical, all as shown in Figure 5, the cover 3 and lever arm assembly is rotated through whatever angle is necessary to bring the plane of motion of the lever arm 20 into correspondence with that of arm 30. Such an arrangement would be adaptable to any angle of inclination, even where the pipe was inclined at an angle of ninety degrees to the vertical or, in other words, horizontally.

It will be apparent to those skilled in the art that the invention herein described provides an improved automatic temperature regulator of the surface type which responds quickly and accurately to temperature variations and which eliminates the necessity of breaking piping connections and eliminates the use of wells and other fittings such as T connections and the like. The device is further capable of installation and adjustment by unskilled operators and possesses great flexibility both as regards installation on various types of equipment and adaptation for use in practically any position on the system. The interchangeability feature of the lever arm 20 and the rotatability of the cap or cover 3 enable the device to be conveniently and efficiently used on a wide variety of types and designs of systems regardless of their structural arrangement. It is thought that those skilled in the art will recognize that the device has practically universal application and adaptability, having numerous features of utility and novelty.

Various modifications may be made in the device embodying my invention without departing from its spirit and scope, and it is to be understood that the disclosure of this application is merely illustrative and the scope of the invention is to be limited only as determined by the appended claims.

I claim as my invention:

1. A regulator adapted for surface mounting upon a pipe or conduit comprising in combination, a casing containing an expansible and contractible thermostatic cell, said casing having a concave base portion conforming to the contour of a pipe upon which the casing is adapted to be mounted, clamping means extending around said pipe for clamping said casing to said pipe, said casing having a cover rotatable with respect to said base portion, a fulcrum support carried by said cover, a lever arm fulcrumed in said fulcrum support, and actuating means extending through said cover from said thermostatic cell to said lever arm for causing rotation of said lever arm about its fulcrum upon expansion or contraction of said thermostatic cell, said lever arm having a pair of points adapted for cooperation with said actuating means, said points being equidistantly spaced from said lever arm fulcrum and spaced from each other so that the line between one point and said fulcrum is substantially normal to the line between the other point and said fulcrum whereby reversing said lever arm in said fulcrum support varies the position of said lever arm for adapting the regulator for mounting upon either a vertical pipe or a horizontal pipe.

2. A regulator adapted for surface mounting upon a device the temperature of which is to be controlled, in combination, a casing containing an expansible and contractible thermostatic cell, said casing having a cover, means for securing said casing in heat conductive relationship with said device, a fulcrum support carried by said cover, a lever arm fulcrumed in said fulcrum support, and actuating means extending through said cover from said thermostatic cell to said lever arm for causing rotation of said lever arm about its fulcrum upon expansion or contraction of said thermostatic cell, said lever arm having a pair of points adapted for cooperation with said actuating means, said points being equidistantly spaced from said lever arm fulcrum and spaced from each other so that the line between one point and said fulcrum is substantially normal to the line between said other point and said fulcrum whereby reversing said lever arm in said fulcrum support varies the position of said lever arm with respect to said casing.

3. A regulator of the class described, in combination, a casing having a cover, an expansible and contractible cell in said casing adapted to expand and contract upon changes in pressure, a fulcrum support carried by said cover, a lever arm fulcrumed in said fulcrum support, and actuating means extending through said cover from said cell to said lever arm for causing rotation of said lever arm about its fulcrum upon expansion or contraction of said cell, said lever arm having a pair of points adapted for cooperation with said actuating means, said points being equidistantly spaced from said lever arm fulcrum and spaced from each other so that the line between one point and said fulcrum is substantially normal to the line between said other point and said fulcrum whereby reversing said lever arm in said fulcrum support varies the position of said lever arm with respect to said casing.

4. A heat regulator for operating the controller for a heater and adapted for mounting on a substantially horizontal pipe portion between the heater and a storage tank, said regulator comprising a casing containing an expansible and contractible thermostatic cell, said casing having a concave bottom wall portion conforming to the contour of said pipe, said bottom wall portion and said thermostatic cell having engaging surfaces, clamping means adapted to extend around said pipe for clamping said casing to said pipe, said casing having a cover rotatable with respect to said base portion, locking means for locking said cover to said casing in any rotative position with respect thereto, a fulcrum support carried by said cover, a lever fulcrumed in said fulcrum support, actuating means extending through said cover from said thermostatic cell to said lever arm for causing rotation of the lever arm about its fulcrum upon expansion and contraction of said thermostatic cell, said rotatable cover being adapted to rotate in a horizontal plane when the regulator is mounted on the pipe so that the lever arm rotates in a vertical plane, whereby rotation of said cover and proper location of the regulator on the pipe permits the use of a simple straight connector between the lever arm and the heater controller.

5. A heat regulator for operating the controller for a heater and adapted for mounting on an inclined pipe portion between the heater and a storage tank which pipe section is inclined with respect to the vertical, said regulator comprising a casing containing an expansible and contractible thermostatic cell, said casing having a concave bottom wall portion conforming to the contour of said pipe, said bottom wall portion and said thermostatic cell having engaging surfaces, clamping means adapted to extend around said pipe for clamping said casing to said pipe, said casing having a cover rotatable with respect to said base portion, said cover being adapted to rotate in a vertical plane when the regulator is mounted on said pipe in a position such that said cover lies in a vertical plane, a fulcrum support carried by said cover, a bell crank type of lever fulcrumed in said fulcrum support and having one arm actuated by said cell and another arm extending substantially horizontally, rotation of said cover permitting adjustment of said lever so as to rotate in a vertical plane even when said pipe portion is not entirely vertical, said bell crank lever being adapted to actuate the heater controller.

JOHN M. LARSON.